United States Patent
Greene et al.

(10) Patent No.: US 8,584,617 B2
(45) Date of Patent: *Nov. 19, 2013

(54) COATED CLUMPING LITTER

(75) Inventors: Phillip Brent Greene, Jackson, MO (US); James Dean Job, Kelso, MO (US); James Max Kearbey, St. Louis, MO (US); Cesar J. Mauras, Croton-on-Hudson, NY (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/345,218

(22) Filed: Jan. 6, 2012

(65) Prior Publication Data

US 2012/0103270 A1     May 3, 2012

Related U.S. Application Data

(60) Continuation of application No. 13/100,087, filed on May 3, 2011, now Pat. No. 8,096,267, which is a division of application No. 11/106,124, filed on Apr. 14, 2005, now Pat. No. 7,958,847, which is a continuation of application No. 10/068,058, filed on Feb. 5, 2002, now Pat. No. 6,887,570.

(51) Int. Cl.
*A01K 29/00* (2006.01)

(52) U.S. Cl.
USPC .......................................... 119/173; 119/171

(58) Field of Classification Search
USPC ................. 119/169, 171, 173, 161; 428/403
See application file for complete search history.

(56) References Cited

U.S. PATENT DOCUMENTS

| | | | | |
|---|---|---|---|---|
| 5,094,189 A * | 3/1992 | Aylen et al. | 119/173 |
| 5,101,771 A * | 4/1992 | Goss | 119/173 |
| 5,183,010 A * | 2/1993 | Raymond et al. | 119/172 |
| 5,267,531 A * | 12/1993 | Appel et al. | 119/171 |
| 5,339,769 A * | 8/1994 | Toth et al. | 119/173 |
| 5,359,961 A * | 11/1994 | Goss et al. | 119/173 |
| 5,452,684 A * | 9/1995 | Elazier-Davis et al. | 119/173 |
| 5,469,809 A * | 11/1995 | Coleman | 119/173 |
| 5,529,022 A * | 6/1996 | Nelson | 119/173 |
| 5,577,463 A * | 11/1996 | Elazier-Davis et al. | 119/173 |
| 5,609,123 A * | 3/1997 | Luke et al. | 119/173 |
| 5,638,770 A * | 6/1997 | Peleties | 119/173 |
| 5,647,300 A * | 7/1997 | Tucker | 119/173 |
| 5,775,259 A * | 7/1998 | Tucker | 119/173 |
| 5,806,462 A * | 9/1998 | Parr | 119/173 |
| 5,826,543 A * | 10/1998 | Raymond et al. | 119/173 |
| 5,836,263 A * | 11/1998 | Goss et al. | 119/173 |
| 5,975,019 A * | 11/1999 | Goss et al. | 119/173 |
| 6,019,063 A * | 2/2000 | Haubensak et al. | 119/173 |
| 6,089,190 A * | 7/2000 | Jaffee et al. | 119/173 |
| 6,767,507 B1 * | 7/2004 | Woo et al. | 422/5 |
| 6,887,570 B2 * | 5/2005 | Greene et al. | 428/403 |

* cited by examiner

*Primary Examiner* — T. Nguyen
(74) *Attorney, Agent, or Firm* — Julie M. Lappin; Benjamin J. Sodey

(57) ABSTRACT

A clumping animal litter is disclosed which includes non-swelling particles and a swelling agent coated on the non-swelling particles. In one embodiment, the non-swelling particles are manufactured by agglomerating clay fines.

14 Claims, 3 Drawing Sheets

| Sample | 15 min saline | | 15 min urine | | 1 hr urine | | 24 hr urine | |
|---|---|---|---|---|---|---|---|---|
| | Cl. Wt. | Cl. Str. | Cl. Wt. | Cl. Str. | Cl. Wt. | Cl. Str. | Cl. Wt. | Cl. Str. |
| A Control- Blm 75/25 scoop blend | 27.66 | 0.94 | 26.82 | 0.91 | 26.15 | 1.10 | 20.74 | 1.51 |
| | 27.72 | 0.93 | 26.85 | 0.92 | 26.29 | 1.04 | 20.79 | 1.66 |
| | 27.53 | 0.96 | 26.97 | 0.95 | 26.37 | 1.04 | 20.11 | 1.97 |
| avg. | 27.64 | 0.94 | 26.88 | | 26.27 | 1.06 | 20.55 | |
| B CMS prototype #2 | 32.95 | 1.17 | 32.04 | 0.93 | 32.27 | 1.23 | 28.52 | 7.13 |
| | 32.97 | 1.26 | 31.54 | 1.16 | 31.23 | 0.95 | 27.38 | 7.80 |
| | 32.92 | 1.10 | 32.18 | 1.11 | 32.00 | 1.21 | 27.22 | 6.02 |
| avg. | 32.95 | 1.18 | 31.92 | | 31.83 | 1.13 | 27.71 | |
| C CMS prototype #3 | 32.61 | 1.12 | 33.17 | 1.31 | 31.44 | 1.44 | 27.59 | 6.80 |
| | 32.74 | 1.42 | 33.65 | 1.29 | 28.99 | 1.09 | 27.08 | 5.81 |
| | 32.43 | 1.16 | 33.94 | 1.35 | 32.10 | 1.26 | 26.94 | 3.74 |
| avg. | 32.59 | 1.23 | 33.59 | | 30.84 | 1.26 | 27.20 | |
| D CMS prototype #4 | 32.20 | 1.38 | 32.43 | 1.06 | 30.78 | 1.09 | 26.78 | 3.29 |
| | 31.86 | 1.25 | 33.16 | 1.59 | 31.84 | 1.66 | 26.98 | 3.03 |
| | 31.53 | 1.37 | 32.07 | 1.68 | 32.42 | 1.22 | 27.50 | 4.88 |
| avg. | 31.86 | 1.33 | 32.55 | | 31.68 | 1.32 | 27.08 | |
| E CMS prototype #7 | 33.36 | 1.14 | 35.09 | 1.41 | 35.24 | 1.25 | 31.23 | 5.59 |
| | 34.37 | 1.23 | 34.61 | 1.26 | 35.43 | 1.69 | 29.45 | 3.66 |
| | 34.33 | 1.25 | 34.69 | 1.52 | 34.38 | 0.97 | 27.94 | 3.46 |
| avg. | 34.02 | 1.21 | 34.80 | | 35.02 | 1.30 | 29.54 | |
| F CMS prototype #8 | 34.62 | 1.52 | 34.76 | 1.25 | 32.97 | 0.97 | 29.78 | 4.93 |
| | 34.17 | 1.23 | 35.34 | 1.45 | 34.17 | 1.02 | 29.64 | 4.48 |
| | 34.47 | 1.21 | 35.41 | 0.94 | 33.79 | 1.58 | 27.76 | 3.69 |
| avg. | 34.42 | 1.32 | 35.17 | | 33.64 | 1.19 | 29.06 | |

Note: Standardized male urine (sp. Gr. 1.050) was used for all urine clump strength testing. 2% Saline solution was used for all saline clump testing.

CMS Prototype Samples B through F are 70.0% Seed Base produced from by-product dust, and 30.0% 200 mesh Bentonite coating powder.

FIG. 2

| A | | | B | | | C | | |
|---|---|---|---|---|---|---|---|---|
| Screen Analysis | | | Screen Analysis | | | Screen Analysis | | |
| mesh | grams | % | mesh | grams | % | mesh | grams | % |
| 8 | 0 | 0 | 8 | 76.5 | 20.1 | 8 | 52.1 | 13.1 |
| 12 | 0.8 | 0.2 | 12 | 195.4 | 51.3 | 12 | 197.7 | 49.8 |
| 14 | 3.8 | 0.9 | 14 | 83.2 | 21.9 | 14 | 105.6 | 26.6 |
| 20 | 141 | 35.1 | 20 | 18.2 | 4.8 | 20 | 16.6 | 4.2 |
| 40 | 214.6 | 53.5 | 40 | 0.7 | 0.2 | 40 | 0.4 | 0.1 |
| 50 | 33.4 | 8.3 | 50 | 0 | 0 | 50 | 0 | 0 |
| pan | 7.8 | 1.9 | pan | 6.6 | 1.7 | pan | 24.9 | 6.3 |
| Fin.Wt. | 401.4 | | Fin.Wt. | 380.6 | | Fin.Wt. | 397.3 | |

| D | | | E | | | F | | |
|---|---|---|---|---|---|---|---|---|
| Screen Analysis | | | Screen Analysis | | | Screen Analysis | | |
| mesh | grams | % | mesh | grams | % | mesh | grams | % |
| 8 | 66.5 | 16.2 | 8 | 25.2 | 6.6 | 8 | 48.5 | 12.6 |
| 12 | 220.9 | 53.7 | 12 | 174.3 | 45.5 | 12 | 195.3 | 50.8 |
| 14 | 83.1 | 20.2 | 14 | 108.3 | 28.3 | 14 | 87.2 | 22.7 |
| 20 | 17.8 | 4.3 | 20 | 53.6 | 14 | 20 | 36.9 | 9.6 |
| 40 | 0.4 | 0.1 | 40 | 5 | 1.3 | 40 | 3.4 | 0.9 |
| 50 | 0 | 0 | 50 | 1.1 | 0.3 | 50 | 0.1 | 0 |
| pan | 22.7 | 5.5 | pan | 15.8 | 4.1 | pan | 13.3 | 3.5 |
| Fin.Wt. | 411.4 | | Fin.Wt. | 383.3 | | Fin.Wt. | 384.7 | |

| Sample | Bulk Density (lbs./cu. Ft.) | Moisture (percent) |
|---|---|---|
| A | 55.8 | 6.21 |
| B | 46.6 | 9.75 |
| C | 47.5 | 6.65 |
| D | 45.9 | 5.65 |
| E | 49.2 | 7.96 |
| F | 48.9 | 8.62 |

FIG. 3

COATED CLUMPING LITTER

CROSS-REFERENCE TO RELATED APPLICATIONS

This application is a continuation of application Ser. No. 13/100,087, filed May 3, 2011, which is divisional of application Ser. No. 11/106,124, filed on Apr. 14, 2005, now U.S. Pat. No. 7,958,847, which is a continuation of application Ser. No. 10/068,058, filed Feb. 5, 2002, now U.S. Pat. No. 6,887,570. Each of these applications is incorporated by reference herein in their entirety.

BACKGROUND OF THE INVENTION

This invention relates generally to absorbent materials, and more specifically to, various litter compositions used for the control and removal of animal waste.

Known litter compositions are fabricated primarily from one of four materials: clay; vegetable matter such as grass, hay or alfalfa; wood chips, shavings or sawdust; and paper, such as shredded, flaked or pelletized paper. Known clay litters are prone to produce dust, and tracking out by the animal. Further, production of such clay litters results in a large quantity of dust being produced, sometimes referred to as clay fines. Clay fines present a problem to the litter manufacturers since the fines are a waste product and require disposal. In addition such clay products are not biodegradable.

Sodium bentonite clay is one known material used in the production of litters and is known for its excellent absorption and clumping qualities, as well as for odor retention. However, sodium bentonite is relatively expensive compared to other litter components. Therefore, attempts have been made to reduce the amount of sodium bentonite in clumping litters, for example, mixing pellets of non-absorbing clays with pellets of sodium bentonite clay in varying ratios. However, in these known litters, the properties which are most desirable in the sodium bentonite have been underutilized as most of the clumping and binding qualities of sodium bentonite occur at or near the surface of the clay.

SUMMARY OF THE INVENTION

In one aspect, an animal litter is disclosed which comprises non-swelling particles and a swelling agent coated on the non-swelling particles.

In another aspect, an absorbent material is disclosed which comprises clay particles in a size range of −10 to +50 mesh and a coating for the particles which comprises a bentonite powder.

In still another aspect, a clumping animal litter is disclosed which comprises clay particles in a size range of about −10 to +50 mesh which are agglomerated from clay fines of about −50 mesh size. A coating surrounds the particles.

In a further aspect, a method for manufacturing a clumping animal litter is disclosed which comprises agglomerating clay fines into particles and coating the particles with a powder.

In yet another aspect, a clumping animal litter is disclosed which comprises clay particles in a size range of about −10 to +50 mesh in size and bentonite powder of about 200 mesh size. The powder is applied as a coating to the particles in an amount of about 20% to about 40% by weight.

Additional features and advantages of the present invention are described in, and will be apparent from, the following Detailed Description of the Invention and the figures.

BRIEF DESCRIPTION OF THE FIGURES

FIG. 2 is a clumping analysis of several samples of coated clumping litter.

FIG. 3 shows a screen analysis, a bulk density, and a moisture content for each sample analyzed in FIG. 2.

DETAILED DESCRIPTION OF THE INVENTION

Figure 1:
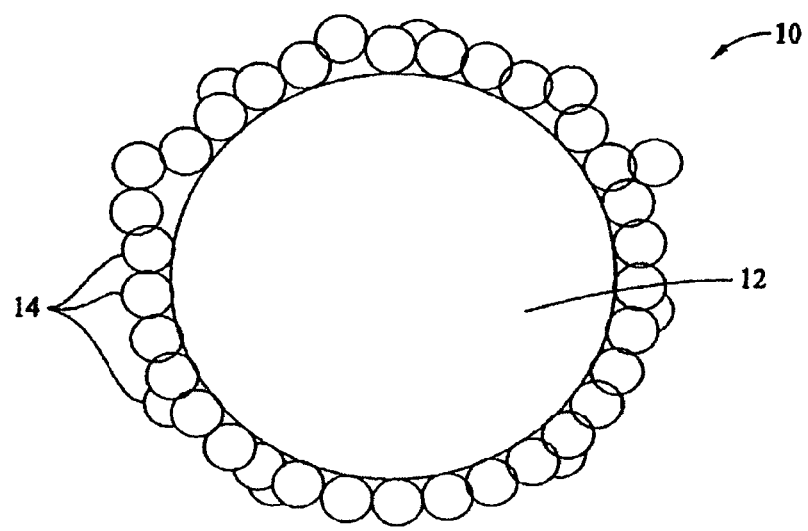
FIG. 1 is a cross sectional view of a particle of coated clumping litter.

Referring to FIG. 1, absorbent particles 10 include clay fines agglomerated into clay particles 12, which are coated with a powder 14. In one embodiment, absorbent particles 10 are utilized in an animal litter. In alternative embodiments, the animal litter includes cat, dog, hamster and livestock litter. The clay fines used in the agglomeration process are about −50 mesh in size and are sometimes referred to as a clay seed base or a seed material. In an exemplary embodiment, clay particles 12 range in size from about −10 mesh to about +50 mesh, based on standard U.S. mesh.

In an exemplary embodiment, the clay fines are agglomerated using a pin mixer. A powder 14 is applied to particles 12 to form a coating. Powder 14 is the active ingredient of the litter. Exemplary coating powders include at least one of a sodium bentonite powder and a bentonite/guar gum blended powder. However, the powder coatings may be augmented with either or both of an odor control agent and an antimicrobial agent. Particle 10 is spherical in shape, the shape shown is by way of example only as it is contemplated that a host of shapes and sizes of coated particles can be produced by the embodiments and processes described herein.

One specific embodiment includes recovery of waste fines which include Calcium-Montmorillonite. The Calcium-Montmorillonite fines are agglomerated in a pin mixer using water as a binder. The agglomerated fines have a moisture content of about 20% to about 40%. In another embodiment, the fines have a moisture content of about 28% to about 34%. The agglomerated fines are then coated with a bentonite powder of about 200 mesh using a centrifugal coater or a rotary coater/dryer system.

In one embodiment, the clay fines are fed into a pin mixer using a screw extruder. Moisture (water) is added to the fines to act as a binder, in one embodiment about 28%, while in the extruder. The fines and the moisture result in a cake like substance as it enters the pin mixer. A pin mixer includes a shaft with a series of pins which breaks up the cake and results in the formation of small, spherically shaped particles which are separated from the cake-like batch using shaker screens. As previously described, in one embodiment, the clay fines are about −50 mesh in size and after addition of the moisture and the pin mixing process, resulting in particles 12 of between about −10 mesh and +50 mesh in size. Other methods are contemplated which include using binders of guar gum and water or starch and water.

Another embodiment utilizes a blend of clay fines and bentonite fines with water as a binder to produce particles 12 through the pin mixing process. Still another embodiment utilizes sodium bentonite fines with water as a binder to produce particles 12 of between about −10 mesh and +50 mesh in size through the pin mixing process. The agglomerated fines, including the clay and bentonite embodiment, or the bentonite embodiment, are then coated with a bentonite powder of about 200 mesh using a centrifugal coater or a rotary coater/dryer system for improved clumping capability.

In alternative embodiments, methods for coating an outer surface of clay particles 12 with powder 14 include utilization of at least one of a fluidized bed dryer, a semi-continuous centrifugal coater or a rotary coating and drying system. In the rotary system, clay particles 12 and powder 14 are tumbled in a drum to mix for about 60 seconds. The litter is then removed from the drum and the drum is heated to about 300° to about 400° Fahrenheit and the litter is returned to the drum and dried until about an 8% moisture content is obtained.

The resulting coated litter is typically in the −10 to +50 mesh size range, with a moisture content from about 15% to about 5%, preferably with a moisture content of about 8%. In one embodiment, the bentonite coating is about 20% to about 40% by weight of a coated particle. In an alternative embodiment, the bentonite coating is about 25% to about 35% by weight of a coated particle. In a further alternative embodiment, the bentonite coating is about 30% by weight of a coated particle.

In alternative method for producing the litter, the agglomerated fines are placed in a fluidized bed and bentonite coating is sprayed in a low concentration solution.

FIGS. 2 and 3 are an analysis of several samples of coated clumping litter which includes 70% by weight particles produced from fines as described above and 30% by weight 200 mesh bentonite coating. FIG. 2 illustrates clumping weight and clumping strength for several representative samples and is charted based upon wetting, for example, 15 minutes after wetting with a saline solution, and for 15 minutes, one hour, and 24 hours after being wetted with a standard urine sample. FIG. 3 shows a screen analysis, a bulk density, and a moisture content for each sample analyzed in FIG. 2. The screen analysis indicates a weight and a percentage for each sample that passed through standard mesh screens, for example, 8, 12, 14, 20, 40, and 50 mesh screens.

The litter resulting from the compositions and methods described above has superior clumping properties as the active clumping agent is kept on the surface of the particles, where the clumping bonds are formed. in addition, the litter has a dust content which is lower than known clumping litters, resulting in less tracking, as the coating processes described above result in a shell being formed around the agglomerated particles. Further, the litter is easier to remove from litter boxes than known clumping litters as the litter described herein is less likely to attach to litter boxes.

In the above described embodiments, coating with bentonite provides a litter which includes the clumping and absorption qualities of a litter which is composed solely of sodium bentonite. However, due to the coating process, the amount by weight of sodium bentonite is reduced over known clumping litters, resulting in more efficient use of the sodium bentonite while providing a production cost savings over those litters with higher percentage amounts of sodium bentonite. In addition, the coated litter produced provides a lighter weight product and has a unique, homogeneous appearance that appeals to consumers. Further, the agglomeration process results in a utilization of clay product fines, which heretofore have been considered waste products, and since clay is not biodegradable, clay fines have traditionally required space for disposal.

While the invention has been described in terms of various specific embodiments, those skilled in the art will recognize that the invention can be practiced with modification within the spirit and scope of the claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An animal litter composition comprising (i) a particle comprising non-swelling clay fines; and (ii) a coating on an outer surface of the particle, the coating comprising a bentonite powder.

2. The animal litter according to claim 1 wherein the bentonite powder comprises sodium bentonite.

3. The animal litter according to claim 1 wherein the bentonite powder has a size range of about 100 mesh to about 300 mesh.

4. The animal litter according to claim 3 wherein the bentonite powder has a size of about 200 mesh.

5. The animal litter according to claim 1 wherein the particles have a size range of about −10 to about +50 mesh.

6. The animal litter according to claim 1 wherein the bentonite powder is about 20% to about 40% by weight of the animal litter.

7. The animal litter according to claim 1 wherein the bentonite powder is about 25% to about 35% by weight of the animal litter.

8. The animal litter according to claim 1 wherein the bentonite powder is about 30% by weight of the animal litter.

9. The animal litter according to claim 1 wherein the coating comprises at least one of a bentonite powder and a bentonite/guar gum powder blend.

10. The animal litter according to claim 1 wherein the coating further comprises an odor control agent.

11. The animal litter according to claim 1 wherein the coating further comprises an anti-microbial agent.

12. The animal litter according to claim 1 wherein the particle further comprises bentonite fines.

13. The animal litter according to claim 1 wherein the non-swelling clay fines have a size of about −50 mesh.

14. The animal litter according to claim 1 wherein the clay fines comprise Calcium-Montmorillonite fines.

* * * * *